United States Patent [19]

Kleinknecht

[11] Patent Number: 4,579,454

[45] Date of Patent: Apr. 1, 1986

[54] OPTICAL PROFILOMETER FOR STEEP SURFACE CONTOURS WITH SIGNIFICANT SURFACE TILT

[75] Inventor: Hans P. Kleinknecht, Bergdietikon, Switzerland

[73] Assignee: RCA Corporation, Princeton, N.J.

[21] Appl. No.: 783,268

[22] Filed: Oct. 4, 1985

Related U.S. Application Data

[63] Continuation of Ser. No. 475,128, Mar. 14, 1983, abandoned.

[51] Int. Cl.⁴ .............................................. G01B 11/24
[52] U.S. Cl. ...................................... 356/376; 250/201
[58] Field of Search ............... 356/123, 371, 375, 376; 250/201 AF, 201 DF

[56] References Cited

U.S. PATENT DOCUMENTS 3,719,421 3/1973 Poilleux et al. ............. 250/201 AF
3,925,603 12/1975 Naruse et al. ................ 250/201 DF

FOREIGN PATENT DOCUMENTS 2704 1/1979 Japan ................................. 356/123

OTHER PUBLICATIONS

*The Microscope*, vol. 21, 1st Qt., Jan. 1973, pp. 59-64, entitled "Quantitative Determination of Surface Topography by Light Microscopy," by H. E. Keller.
*RCA Engineer*, 26-2, Sep./Oct. 1980, pp. 75-80, entitled "Electro-optical Techniques for Measurement and Inspection," by D. P. Bortfeld et al.
*Applied Optics*, vol. 21, No. 17, 9/1/82, pp. 3200-3208, entitled, "Optical Profilometer", by Y. Fainman et al.

*Primary Examiner*—R. A. Rosenberger
*Attorney, Agent, or Firm*—Birgit E. Morris; Donald S. Cohen; Joseph D. Lazar

[57] ABSTRACT

An optical profilometer for surface contours subject to tilt is optically scanned to measure the surface contours. Surface tilt effects are obviated by slitted apertures in the paths of the reflection beams to pass the beams with large surface tilts (on the order of 30°) without loss of sensitivity, accuracy, or precision.

1 Claim, 7 Drawing Figures

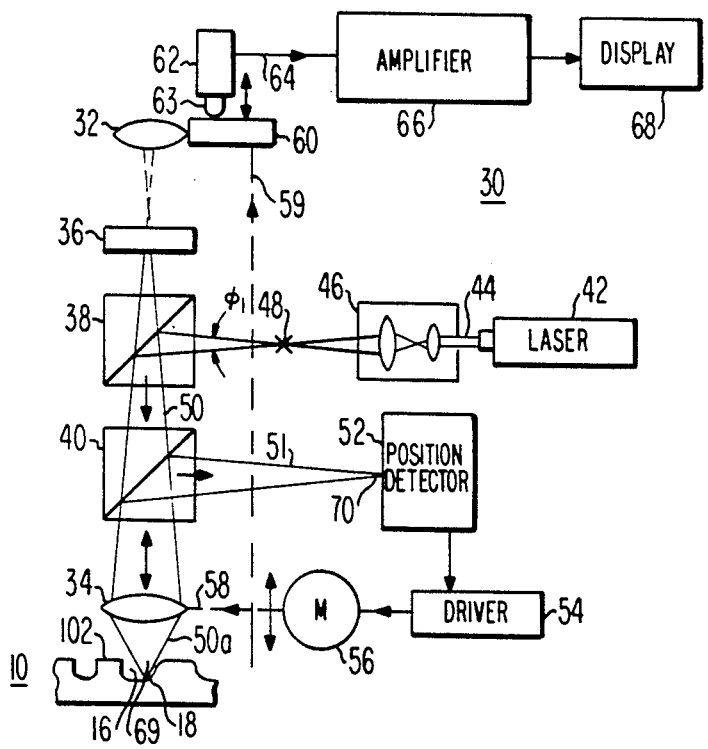
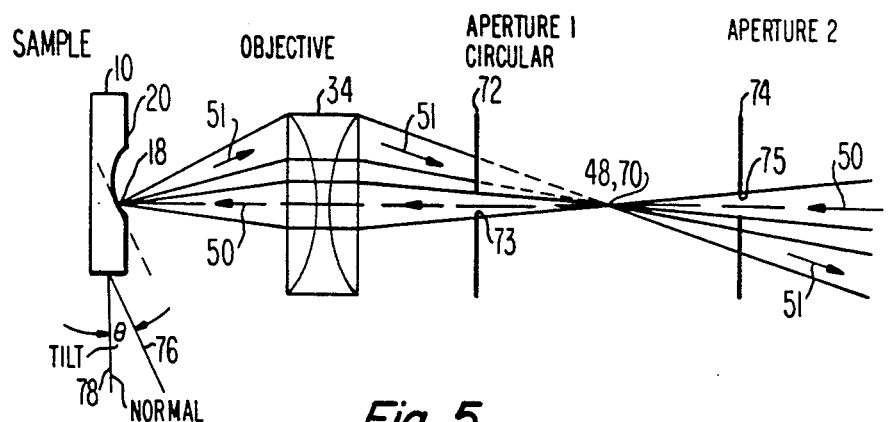
Fig. 3
PRIOR ART
Fig. 5
PRIOR ART

OPTICAL PROFILOMETER FOR STEEP SURFACE CONTOURS WITH SIGNIFICANT SURFACE TILT

This is a continuation of application Ser. No. 475,128 filed 3-14-83, now abandoned.

This invention relates to optical profilometry, and, more particularly, to optical profilometry in which the surface to be monitored has a steep contour with significant surface tilt.

BACKGROUND OF THE INVENTION

In many steps of electronic device fabrication, it is important to measure surface shapes or surface contours with typical peak-to-valley dimension of 10 to 100 micrometers ($\mu$m). This range of dimensions is typically too large to be measured by optical interference techniques. Therefore, one usually uses for such dimensions a depth gauge with a stylus which touches the surface of the sample. The position of the stylus in the direction perpendicular to the sample surface can be sensed by conventional electronic means. The most widely used mechanisms are ones that utilize a linearly variable differential transducer (LVDT), such as those used in the depth gauges with the trade names Dektak and Talysurf. Several disadvantages of these instruments include the following: (1) the stylus can damage the surface of the sample if the sample is soft or brittle; (2) the mechanical stylus provided with such instruments necessarily has a width which prevents it from reaching into narrow holes and grooves of the surface; (3) this type of measurement is inherently slow. These three impediments, at least in the use of LVDT instruments, become more significantly a problem when one looks at the particular problem occurring in silicon power transistor manufacturing, as will be explained in more detail hereinafter.

The fabrication of semiconductor devices, such as power transistors and thyristors, involves the etching of deep grooves (e.g., 30–100 $\mu$m) into the surface of, for example, silicon wafers. These grooves electrically separate the individual devices from one another. Moreover, these grooves are the site where the high collector field of the transistor meets the surface and where the passivating glass and oxide layers have to be applied. Therefore, the groove depth has to be monitored and controlled in manufacturing the device to tolerances of about ±5%. Since the dimensions are large compared to the wavelength of light and since the surfaces can be rough in the form of etched pits, the usual optical interference techniques can not be used. Furthermore, the light section microscope technique used heretofore is relatively slow and somewhat inaccurate due to being dependent upon the operators' skill. See p. 61 of *The Microscope,* Vol. 21, First Qt. 1973, pp. 59–66 for a description by H. E. Heller of the light section technique.

Reference is also made to two articles: "Electro-optical Techniques for Measurement and Inspection" by D. P. Bortfeld et al. published in the RCA Engineer 26-2 September/October 1960, pp. 75–80, particularly FIGS. 7 and 8, and "Optical Profilometer" by Y. Fainman et al. *Applied Optics,* Vol. 21, No. 17, 1 Sept. 1982, pp. 3200–3208 for descriptions of a profilometer.

The conventional profilometer can not measure the contour of steep regions since the reflected light beams are masked from the optics. There is a need, therefore, in the art for a profilometer capable of measuring steep contoured surfaces. The relative steepness of a surface is defined herein by the term tilt which is the deviation in surface angle of the region of a surface contour being examined from a reference plane suitably the horizontal plane that is normal (i.e., perpendicular) to the optical axis.

SUMMARY OF THE INVENTION

According to the present invention, an optical profilometer of the type including an optical microscope with means to automatically focus the microscope has a pair of split reflected beams and a pair of slit apertures and photosensors to sense the focusing position of the microscope. The slitted apertures are positioned in the respective split beam paths to accommodate the surface tilt in a direction along the length of the slits and yet by virtue of the narrowness of the slits be sensitive to longitudinal focus position.

BRIEF DESCRIPTION OF THE DRAWING

FIG. 3 is a schematic of a profilometer of the prior art;

FIG. 5 is a schematic of the optical incident and reflecting paths in the profilometer illustrated in FIGS. 3 and 4 showing how the tilt of the sample surface renders the prior art profilometer monitoring action ineffective;

DETAILED DESCRIPTION OF A PREFERRED EMBODIMENT

Figure 1:
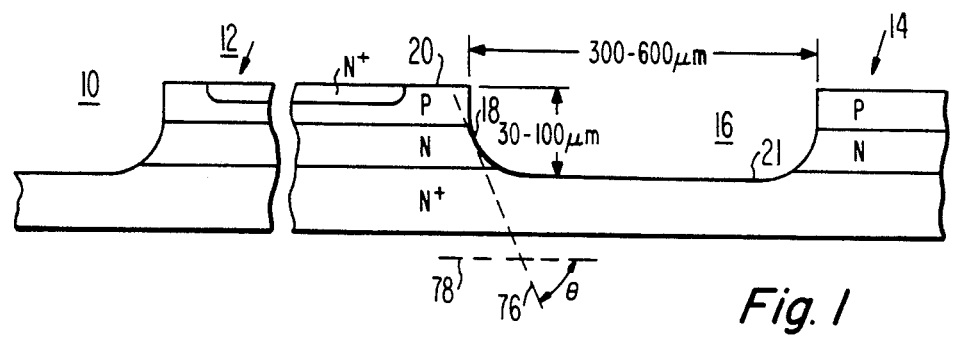
FIG. 1 is a schematic in elevation seen along viewing line 1—1 of FIG. 2 of a mesa-type transistor to be measured as a sample in the practice of the invention.
Figure 2:
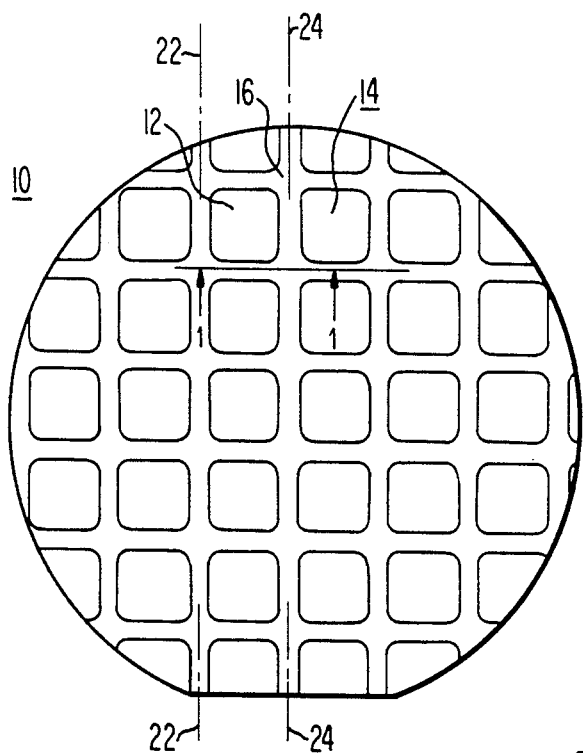
FIG. 2 is a plan view of a device wafer carrying a plurality of the transistors shown in FIG. 1.

The problem solved by the profilometer of the invention will be understood by reference to FIG. 1 and FIG. 2 illustrating in elevation and plan view, respectively, a wafer comprising a plurality of mesa-type transistors 12, 14, etc. Each transistor comprises a substrate N+ region beneath an N region thence a P region and finally an N+ region. Each transistor 12, 14, is separated by a moat 16 which is about 30–100 $\mu$m deep and about 300–600 $\mu$m wide. During the operation of the transistor there is a very high electrical field developed across the N region, that is, the high resistivity region of what is typically the collector of the transistor. Accordingly, the high voltage and thus the high power capability of the device is limited by voltage breakdowns in the region where this N region meets the surface of the moat 16. This critical region, identified by reference 18, is in the side wall of the moat 16 about two thirds the distance down from the upper surface 20. This is the critical region in which the passivating coating consisting typically in combinations of glass, and silicon oxide has to be applied. Accordingly, it is important that the moat depth has to be controlled quite accurately. In the manufacturing process, these moats are produced typically by wet etching while the mesa-tops comprising the surfaces 20 are protected by a photoresist. Heretofore, the etched depth is monitored by light-section microscopes which are rather slow with questionable accuracy with respect to the dimension ranges of these kinds of semiconductor devices.

As seen better in FIG. 2 the wafer of mesa transistors is formed of squares with the moats 16 surrounding the mesas. Thus, large straight sections across the wafer are developed. The side walls of the moats 16 are tilted with respect to a reference surface such as the flat parts of the sample, typically the tops 20 and the bottoms 21 of the moats. The tilt of a section of a side wall, or any part of the sample surface, is characterized firstly by the tilt angle ($\theta$), for example, defined as shown in FIG. 1 by line 78 parallel to surface top 20 and line 76 which is tangential to the surface portion 18. Secondly, the tilt is characterized by a direction of the tilt, i.e. the direction of an axis, which I shall term the tilt axis 22 or 24, etc., around which the plane of the main surface (20) would have to be rotated in order to become parallel to the surface region in question. Thus, within the straight sections of the moat 16, the tilt of the walls along surface portion 18 is predominantly oriented in one direction, namely, along a long dimension of the moat section as shown by dotted lines 22, or 24 shown in FIG. 2. Any of lines 22, 24, etc., is thus a tilt axis. Furthermore, if one wants to measure the profile of moats running perpendicular to moat 16, one simply rotates the wafer by 90°.

Reference is now made to FIG. 3 illustrating a schematic of a profilometer 30 of the prior art. The profilometer 30 is suitably a laser optical profilometer as described in the above-identified articles by Bortfeld et al. and Fainman et al. The profilometer comprises a microscope portion having an ocular lens 32 and an objective lens 34. A filter 36 is positioned near the ocular lens 32. Filter 36 is a green-filter to protect the eyes of the operator looking through the ocular. A pair of beam splitters 38 and 40 are axially positioned along the optical axis to receive light and for detection purposes as will be explained. A helium-neon (He-Ne) laser 42 provides a light beam 44 to an expander and collimator 46 which focuses the light beam at point 48 (with a divergence angle $\phi_1$). Beam 44 then is reflected by beam splitter 38 as beam 50 which passes through beam splitter 40 through objective lens 34 and focused at point 69 approximately on the surface of the wafer 10, as at surface region 18 of the wafer 10.

Light reflected from the surface of the wafer 10 is passed through the objective lens 34 and thence to beam splitter 40 to be reflected along a path perpendicular to the optical axis of the microscope and to come to a third focus 70 within the detector 52. Detector 52, drawn as a box in FIG. 3, is shown in detail in FIG. 4 to be described in more detail below. Detector 52 serves to detect the position of the focal point 70 of reflected beam 51 and to provide a signal in a servo loop to raise or lower the microscope to such a height that the focus 69 of beam 50a is exactly on the surface. This is accomplished by detector 52 providing an electrical control signal to a driver amplifier 54 and thence to a servo motor 56 which is mechanically coupled to adjust the vertical position of the microscope. An inductive stylus 63 of the gauge 62 rests on the shoulder 60 of the microscope to follow the vertical movement of the microscope and provide an electrical signal representing such vertical movements along path 64 to an amplifier 66 and thence to a display 68 for providing a display of vertical microscopic excursions which follow the surface contours of the sample of the wafer 10 as it is scanned relative to the profilometer 30. A commercially available form of the gauge is known as a Linearly Variable Differential Transducer (LVDT). Such apparatus is manufactured under the trade names Dektak, Talysurf, Tesatronic and Sylvac, any one of which being suitable for sensing the vertical excursions. Suitable means, not shown, are provided for moving the wafer 10 relative to the beam 50a to effect a scan of the beam over the wafer surface.

In operation, the light beam 50a from laser 42 illuminates the wafer surface at region 18 of the wafer 10 at one moment of the scan, and the light beam is reflected back and passes through the objective 34. A part of the reflected beam is carried back through beam splitter 38 and is focused at point 48. The reflected focus and the original focus coincide exactly, if the surface of the wafer 10 is exactly at the location of the focus 69 of the laser beam 50a. If the respective original focus 48 and reflective focus do not coincide, then the back reflected focus will be at the left or the right hand side of the original focus position 48 (as seen in FIG. 3) depending on whether the surface at point 18 is lower or higher than the focus 69, respectively.

Similarly, the split-off of the reflected beam produced by the lower beam splitter 40 will come back to focus at the left or right hand side of the focal position 70 within the detector 52. The detector 52 typically provides to driver 54 a negative voltage if the reflected focus is at the left hand side of focus point 70 and a positive voltage if the focus is at the right hand side of the focus 70. This voltage signal is used to drive the servo motor 36 through the driver amplifier 54. The motor 56 moves the microscope comprising lenses 32 and 34 in vertical movements such that the focus 69 on the surface of the moving wafer 10 is kept right at the sample surface, such as, for the moment, illustrated at surface position 18. The stylus 63 of gauge 62 serves, as just mentioned, to follow the movement of the servo motor and thus be able to provide a signal for a visual display of the vertical excursions.

Figure 4:
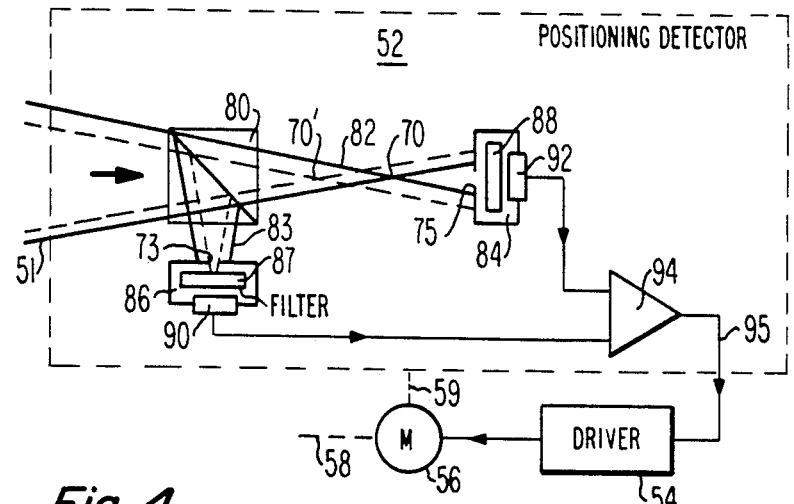
FIG. 4 is a schematic of a portion of the profilometer of FIG. 3.

Reference is made to FIG. 4, which shows, in detail, the detector 52 of FIG. 3. The reflected beam 51 from splitter 40 is passed through a beam splitter 80 which passes a first reflected beam 82 to a sensor 84 having an aperture 75 and a second reflected beam 83 reflected to a second sensor 86 through an aperture 73. In the prior art, these apertures 75 and 73 are round pinholes. The respective split beams are passed through filters 87 and 88 and thence to photosensitive sensor elements 90 and 92, respectively. The respective voltages generated by these sensors are passed to a differential amplifier 94 and thence to driver 54 and thereafter to servo motor 56.

In the operation of the prior art detector 52 illustrated in FIG. 4, the beam splitter 80 provides two partial or split beams, each of which falls on an aperture sensor 84 and 86, respectively. If the microscope is in the balanced focus position, a light beam outlined by the solid lines of FIG. 4 is provided with the focus at point 70, and each sensor 84 and 86 thereby receives the same percentage of the reflected and split light cones. If the scanned sample surface of wafer 10 moves away from the microscope, for example, into moat 16, then the dashed beam outline will exist with the focus further left, as at point 70' in FIG. 4. As a consequence, the sensor 86 receives more light than the sensor 84 giving a negative difference voltage along path 95 which, in turn, causes the servo motor 56 to drive the microscope downward to effect the focus point 69 precisely on the wafer surface 18. In a similar fashion, a positive voltage signal on path 95 is developed for a high surface, that is, for the beam passing by relative movement of the beam and the wafer from location 18 to an upper surface location 102, as shown in FIG. 3, wherein the focus in FIG. 4 moves to the right of point 70 (not shown in FIG. 4).

The problem with the prior art profilometer 30, illustrated in FIGS. 3 and 4, is the effect tilt of the surface of the wafer 10 will have on the sensing and monitoring operation of the profilometer as will be explained by reference to FIG. 5. For convenience, FIG. 5 is simplified to omit the beam splitters 38, 40, and 80 to show both the illuminating and reflecting light paths to appear in an unfolded, i.e., linear or straight line manner. Accordingly, as seen in FIG. 5 there appears a portion of the wafer 10, the objective lens 34, shown in detail as a three-element lens, a mask 72 having a generally circular or symmetrical aperture 73 and a second mask 74 having also having a circular or generally symmetrical aperture 75. The primary beam 50 is focused at point 48 (as in FIG. 3).

A sample surface without tilt will cause the reflected beam 51 to come back on itself and pass at least partly through the apertures 73 and 75. However, if the sample surface is tilted, as illustrated at point 18 in FIG. 5 by an angle $\theta$, the reflected beam 51 will not be able to pass through either of the apertures 73 and 75 resulting thereby in either small or incorrect sensor signals, or both, thus rendering the servo system inoperative. The tilt is illustrated by the angle $\theta$ defined between the tilt plane 76 and the normal plane 78 as shown also in FIG. 1.

Figure 6:
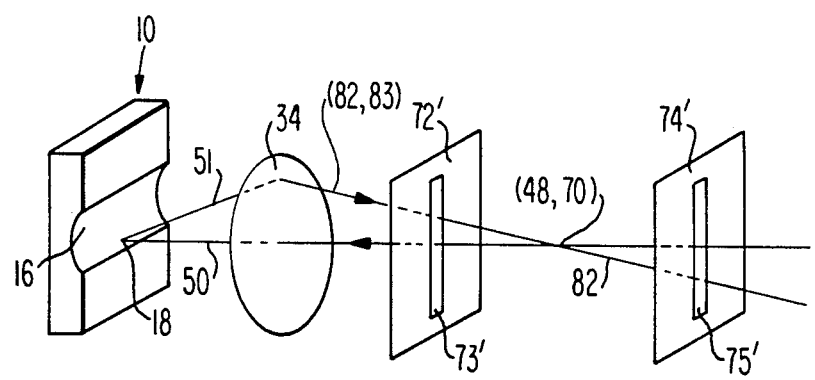
FIG. 6 is a schematic of the light beams of the profilometer according to the invention by which the tilt of the specimen surface does not render the function of the profilometer inoperative.

The problem of the tilt effect rendering the profilometer inoperative, as just explained, is cured according to the present invention by providing slitted apertures in the masks over the photosensors as illustrated in FIG. 6, now to be described.

According to the invention, the deleterious effect of tilt, illustrated in FIG. 5, is cured by modifying the detector 52 of FIGS. 3 and 4, so that the apertures of the sensors 84 and 86 are in the form of slits 73' and 75', respectively, as shown in FIG. 6. The beam 51 reflected from a tilted surface can now pass after being split into beams 82 and 82, respectively, which through its associated slitted aperture 73' or 75', provided the longitudinal dimension of the respective slits is perpendicular to the axis of the tilt, as, for example, any of the axes 22 or 24, etc., described hereinabove. Because of the lateral restriction in the relatively narrower width of the slotted aperture 73' and 75', there is still a difference in light intensity between the two split beams falling on the respective senses, if the microscope is off balance.

As indicated above the amount of surface tilt which can be tolerated before the profilometer fails is a function of the longitudinal dimensions of the slits. The tolerable amount of tilt goes up with increasing slit lengths until it is finally limited by the acceptance angle or size (i.e., the numerical aperture, NA) of the objective 34. The sensitivity to focus position is still adequate provided the width of the slits is about one third of the diameters of the beams illuminating the slit aperture when the system is in focus. Designating this beam diameter, $D_s$, then the width (W) of the slits should be $$W \leq D_s/3 \quad (1)$$

In order to get the tilt limit given by the numerical aperture (NA) of the objective lens, the length (L) of the slits must be $$L \geq \frac{NA}{(1-(NA)^2)^{\frac{1}{2}}} \cdot \frac{D_s}{\phi_1 M} \quad (2)$$

where $\phi_1$ is the divergence or angle (in radians) of the laser beam at the focus point 48 (see FIG. 3) and M is the magnification of the microscope objective lens 34 times the possible tube magnification of the microscope, also known as the tube factor. With the slit apertures of the above prescribed length, the maximal tolerable tilt is $$\theta = \tfrac{1}{2} \arcsin(NA) \quad (3)$$

while pinhole apertures of a diameter equal to $W = D_s/3$ (corresponding to the above slit width) would give a maximal tolerable tilt of $$\theta = \tfrac{1}{2} \phi_1 M \quad (4)$$

The maximal allowable tilt is larger for slit apertures [equation (3)] than for pinholes [equation (4)], as will be shown by the following example:

EXAMPLE

The preferred embodiment of a prototype profilometer was made using a Spectraphysics type 136P He-Ne laser, (2 mW, $\lambda = 0.6328$ $\mu$m, polarized) and a Zeiss Epi microscope with an optical tube length of 256 mm (distance between the objective lens 34 and the focus position 48) and a tube factor of $1.6\times$. The objective lens 34 can be $16\times$ (having a numerical aperture (NA=0.35), $25\times$ (NA=0.40) or $40\times$ (NA=0.85). The convergence angle $\phi_1$, of the laser beam 44 at focus 48 is 0.01 radians by which a $40\times$ objective lens 34 provides a spot size on the sample surface, as at point 18, of 0.6 $\mu$m.

The beam diameter, $D_s$, of the laser beam at the slit apertures is 1.5 mm, which gives, by equation (1), a slit width W=0.5 mm and from equation (2) a slit length L>3.8 mm. Practically, slit apertures 73' and 75' of 0.5 mm by 6.0 mm were used.

The degree of tilt of the sample surface that still provides an operative profilometer using the slitted apertures 73' and 75' with the above dimensions, according to the invention, is limited only by the numerical aperture (NA) of the objective lens 34. Equation (3) gives for a $40\times$ objective lens 34 (NA=0.85) a maximum tilt of about $\theta = 30°$. It should be noted from equation (3), that the theoretical maximum surface tilt is 45°, using a lens having an N.A.=1. This is, of course, an impossible system according to the present state of the optics art. A pin hole aperture of the prior art having a diameter equal to the width of the slit will have a measurement tilt limit of 13° as calculated from equation (4). It is seen thus, that the apparatus of the invention provides for a significant improvement in determining steep surface contours with significant surface tilt of up to 30°.

The photosensors 90 and 92 are photovoltaic silicon diodes type PV-215 of EG and G. For measuring the vertical microscope position at shoulder 60 an electronic depth gauge of the type Tesatronic TTD 30 was used.

The accuracy and precision of the profilometer is limited by the convergence of the laser beam on the sample, that is, the convergence of the beam on sample focus position 69, to about ±1 μm. The range of surface height over which the profilometer works is ±60 μm for a 40× objective lens and over 200 μm for a lower magnification lens, such as a 16× lens.

Figure 7:
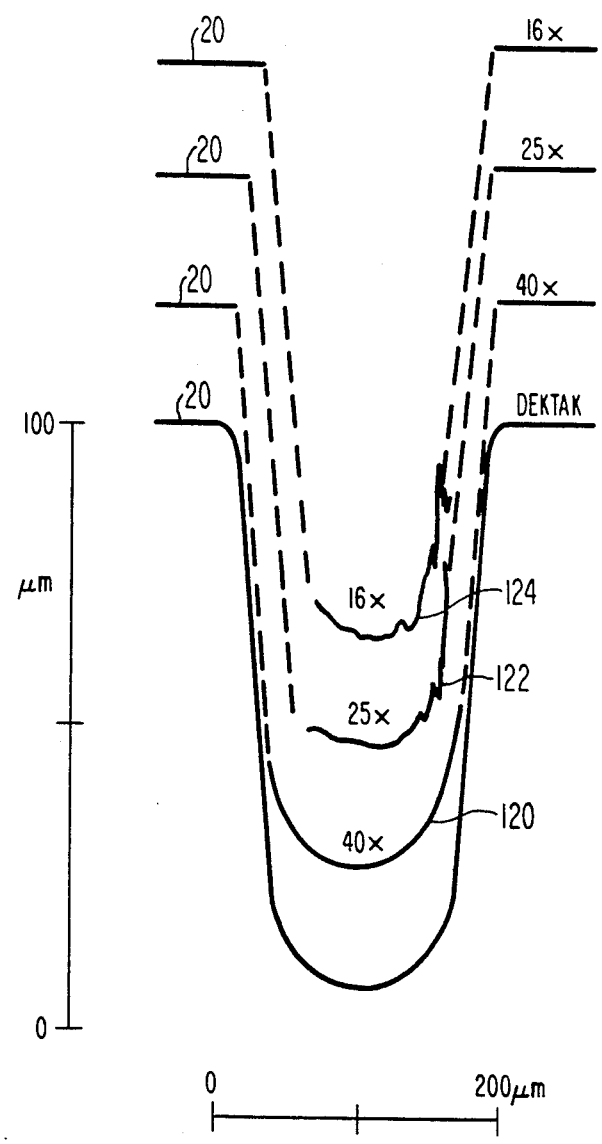
FIG. 7 is a series of curve plots illustrating the results of the profilometer of the invention compared to the prior art Dektak profilometer.

Reference is made to FIG. 7 showing traces recorded on display 68 across a mesa-moat 16 (FIG. 1) taken in accordance with the profilometer of the invention. Various objective lenses 34 were used for comparison as indicated on the curves to a Dektak profilometer trace. The various traces are vertically displaced from each other on the sheet of FIG. 7 for clarity.

It is seen that for the embodiment of the invention utilizing a 40× objective lens, curve 120 is solid in the bottom portion of the moat and is dashed for the portion of the curve up to the surface 20. The solid portion results from the profilometer making measurements within the tilt limit of 30°. The dashed portions correspond to surface portions of the moat having surface tilts greater than 30°. Accordingly, steep portions of the moat surface can not be sensed by the profilometer of the invention for the reasons explained hereinabove. Curve 122 represents the invention utilizing a 25× objective lens. It is seen that this curve represents data of the contour that sensed less portions of the moat than the system arranged with the 40× lens. Similarly, curve 124 represents the invention utilizing 16 objective lens reveals less of the moat contour than the other two embodiments. It is now to be appreciated that the invention is limited essentially by the numerical aperture of the objective lens in accordance with equation (3).

While the invention is described with use of a laser beam, it should be appreciated that a polychromatic light source can be used provided the spot or the beam size striking the surface is of the same order of magnitude as the contours involved. However, in practice, the dimensions of the grooves or moats of surfaces, such as mesa-transistors, are so small that it is preferred for accuracy that a monochromatic collimated light source from a laser be used.

What is claimed is:

1. In an optical profilometer of the type including an optical microscope having an optical axis and an ocular lens and an objective lens, the objective lens positioned over the surface of an object to be inspected, means for illuminating the surface of the object with an incident beam of light, means for sensing light reflected from said surface, and means for automatically focusing said microscope by adjusting the vertical position of said microscope by splitting said reflected beam into two split beams, sensing one of said split beams passing through a first aperture at a given optical path distance from said surface and sensing the other of said split beams through a second aperture at an optical path greater than said first optical path, said object surface being subject to surface tilt about a given axis, said tilt axis being generally parallel to a contour line on said surface, the improvement comprising:

means responsive to said focusing means for providing a signal indicative of the profile of said surface, said surface having one or more recesses with a width dimension within a range of about 300 to 600 micrometers and a depth dimension of about 100 micrometers;

means for determining steep surface contours of said recesses having a maximum surface tilt about said axis of about 30°; said determining means comprising said first and second apertures in the form of slits having respectively long dimensions extending perpendicular to the tilt of an object surface to be inspected, the widths of said slits being about one third the diameter of said split beams and the numerical aperture (NA) of said objective lens being not greater than 0.85;

said incident beam of light and said reflected beam of light being fixed and oriented along the optical axis of said microscope, and said reflected beam being tilted away from said optical axis only as said surface is tilted; and means responsive to said profile signal for providing a visual display of said profile.

* * * * *

UNITED STATES PATENT AND TRADEMARK OFFICE
CERTIFICATE OF CORRECTION

PATENT NO. : 4,579,454

DATED : April 1, 1986

INVENTOR(S) : Hans Peter Kleinknecht

It is certified that error appears in the above-identified patent and that said Letters Patent is hereby corrected as shown below:

Column 6, line 9, "convergence" should appear before angle.

Column 8, line 26, ";" should be --,--.

Signed and Sealed this

Fifteenth Day of July 1986

[SEAL]

Attest:

DONALD J. QUIGG

Attesting Officer

Commissioner of Patents and Trademarks